J. C. SMITH.
CORN SEEDER, &c.
APPLICATION FILED FEB. 10, 1914.
1,099,774.
Patented June 9, 1914.
2 SHEETS—SHEET 1.
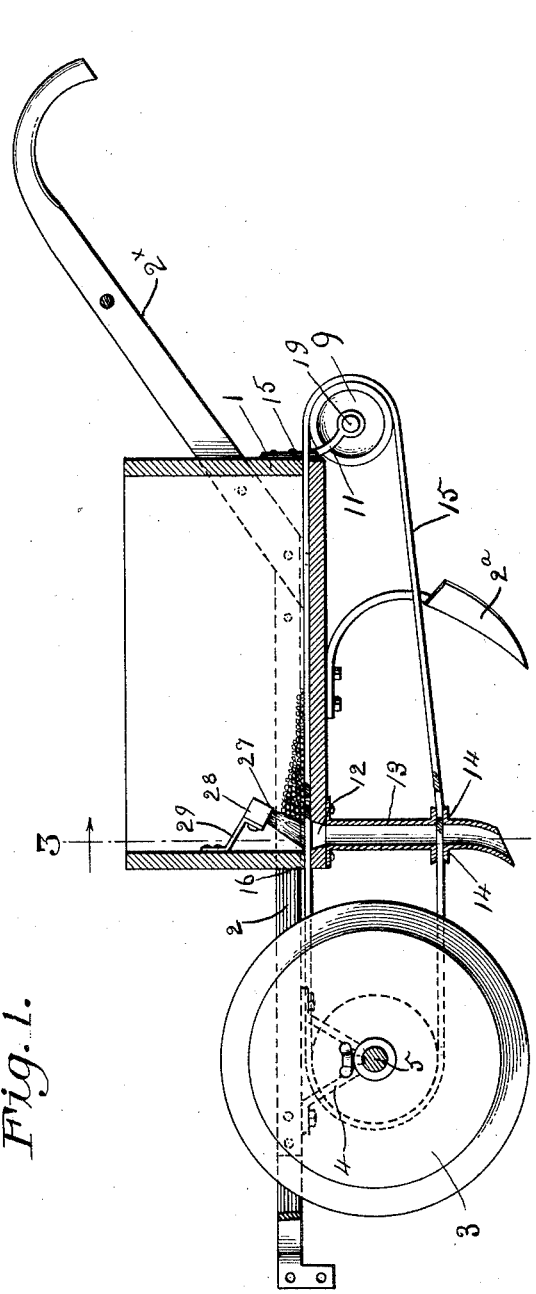
Fig. 1.
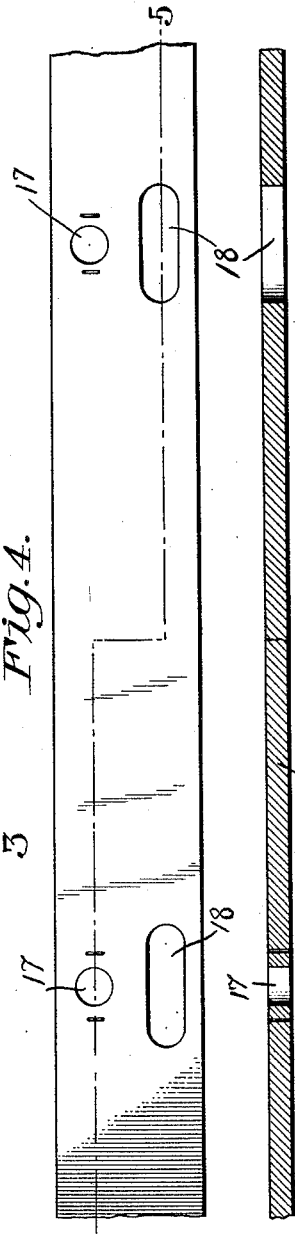
Fig. 4.
Fig. 5.
Witnesses
Fenton N. Belt
J. N. Sherwood
Inventor
James C. Smith,
By Franklin H. Hough
Attorney

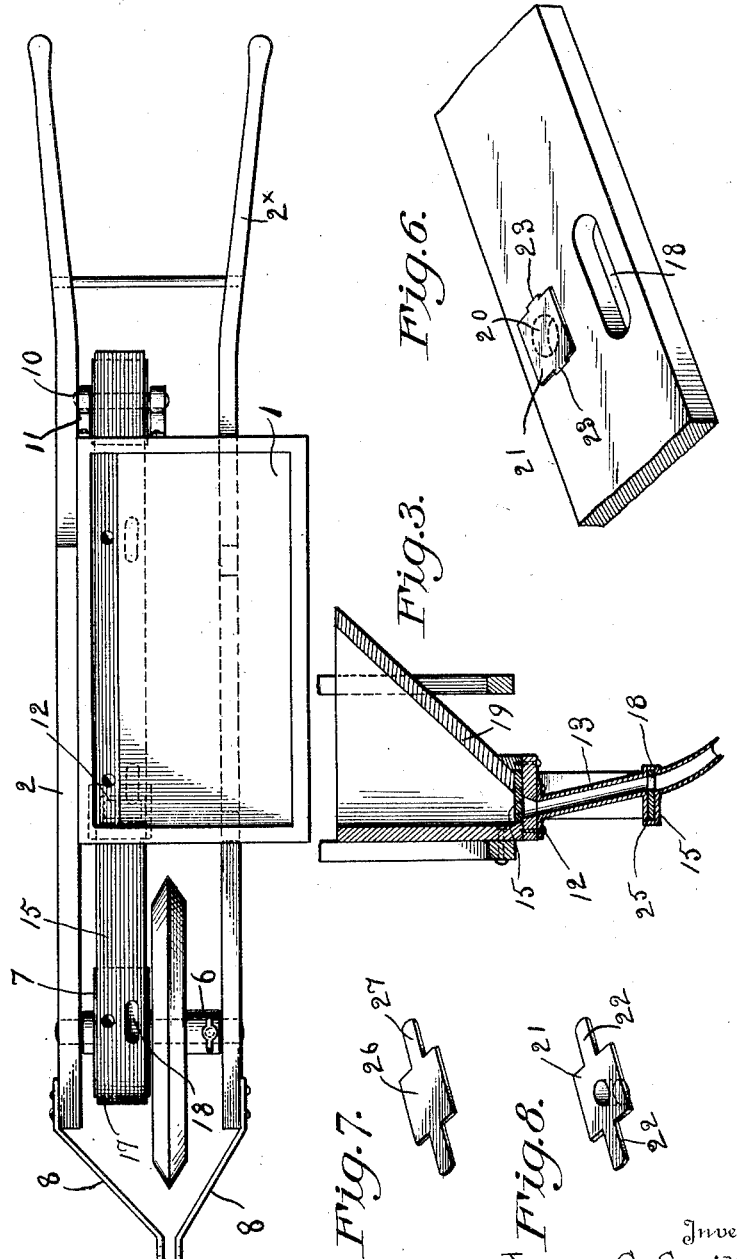

UNITED STATES PATENT OFFICE.

JAMES C. SMITH, OF VALDOSTA, GEORGIA.

CORN-SEEDER, &c.

1,099,774.  Specification of Letters Patent.  Patented June 9, 1914.

Application filed February 10, 1914.  Serial No. 817,908.

*To all whom it may concern:*

Be it known that I, JAMES C. SMITH, a citizen of the United States, residing at Valdosta, in the county of Lowndes and State of Georgia, have invented certain new and useful Improvements in Corn-Seeders, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for planting seed of various kind and comprises essentially a suitable hopper with a spout thereto and in the provision of an endless belt which is movable through the hopper and spout and provided with perforations through certain of which the seed is allowed to pass from the hopper to the spout and through the others the seed discharged from the spout.

The invention consists further in the provision of a seeder having a hopper and an endless belt with perforations therein for the reception of seed, means being provided for varying the capacity of each perforation accordingly as it may be desired to regulate the number of seeds to be planted in a hole.

The invention comprises various details of construction and combinations and arrangements of parts which will be hereinafter fully described, shown in the accompanying drawings and then specifically defined in the appended claims.

My invention is illustrated in the accompanying drawings, in which:—

Figure 1 is a central vertical sectional view through a seeder made in accordance with my invention. Fig. 2 is a top plan view. Fig. 3 is a sectional view on line 3—3 of Fig. 1. Fig. 4 is a top plan view of a portion of the endless belt showing the feeding apertures or openings therein. Fig. 5 is a sectional view on line 5—5 of Fig. 4. Fig. 6 is a detail perspective view of a portion of the endless belt showing one of the adjustable seed cups attached to the belt. Fig. 7 is a blank adapted to be fastened over one of the seed receiving perforations in the belt, and Fig. 8 is a detail perspective view of a plate showing a seed perforation.

Reference now being had to the details of the drawings by numeral, 1 designates a seed hopper which may be of any size or shape and 2 the frame upon which the same is mounted. Said frame is provided with suitable handles $2^x$ and a covering plow $2^a$. Bracket arms 4 are fastened to the under surfaces of the frame and in which the shaft 5 is journaled. A driving wheel 3, having a hub portion 6, is journaled upon the shaft, the circumference of said wheel being preferably beveled as shown, while a scooter, not shown, may be attached to the bars 8 which are secured to the forward end of the frame.

A pulley 7 is fixed to the hub 6 and a second pulley, designated by numeral 9, is mounted upon a shaft 19 journaled in the bracket arms 11. The hopper is provided with an exit opening 12, and 13 designates a spout having transverse slots 14 formed opposite each other in the wall thereof. An endless belt, designated by numeral 15, passes about said pulleys and through slots 14 and 16 formed in the ends of the hopper, the lower edge of which slots 14 and 16 are flush with the bottom of said hopper. Said belt also passes through the slots formed in the opposite walls of the spout, as shown clearly in Fig. 1 of the drawings. Said belt, a top plan of a portion of which is shown in Fig. 4, it will be noted, has two series of perforations, one series designated by numeral 17 and which are mounted at one side of the longitudinal median line, while other openings, designated by numeral 18 and which are elongated slots, are provided along the opposite side of the median line, the transverse center of the openings 18 being opposite the centers of the perforations 17.

Upon reference to Fig. 3, it will be noted that the spout 13 is disposed at an inclination so that any seed which is fed through the perforations 17 will be deflected laterally and discharged through one of the elongated openings 18 when one of the latter comes into registration with the spout and through which openings seed is allowed to be deposited upon the ground immediately behind the wheel 3. It will also be noted upon reference to Fig. 3 that the portion of the endless belt which has the elongated openings 18 passes underneath the inclined side wall 19 of the hopper and blanks said openings 18, thus preventing any seed from passing direct from the hopper through the openings 18 but rather into the openings 17 which are formed in the seed cups or plates 21. Said seed cups or plates 21, a detail of one of which is shown in Fig. 8, are provided with lugs 22 at the ends which are passed through slits 23 formed in the belt and their ends adapted to be clenched upon the opposite face of the belt to securely hold the plates or seed cups 21 in place. It is my purpose to provide plates or seed cups of this nature, each of which has distinct sized openings therein, to the belts in order to regulate the size of the opening desired for feeding seed of different sizes or seed in different quantities as may be desired. It will be noted that, as the belt passes through the slots 13 and 14 formed in the spout, the perforations 17 will be blanked by the slotted projection 25 from one of the slots in the spout and which will cause the seed which has been deposited in the spout 13 above the slots 14 to pass through one of the elongated openings 18.

In order that the seed may be brushed back from the belt as it passes out of the hopper and in order to push any seed which drops into the perforations 17 while a portion of the belt is passing through the hopper, I provide a brush 27, preferably of stiff material and having a head 28, which is fastened to the bracket arm 29 secured to the wall of the seed hopper.

The operation of my invention will be readily understood and is as follows:—As the seeder is moved over the ground, a movement will be imparted to the endless belt which passes through the slots in the opposite ends of the hopper and resting upon the bottom thereof. The seed falling into the perforations will be carried by the marginal walls thereof forward to a location over the exit opening 12 and falling into the spout will be deflected by the inclined position of the latter down to and be caught by that portion of the belt which passes back through the slots in the spout and, when an elongated opening 15 registers with the spout, the seed will fall to the ground and be deposited immediately behind the wheel 3 and the soil will be thrown over the seed by the covering plow 2ᵃ which follows in the rear of the spout.

What I claim to be new is:—

1. A seeder comprising a hopper, a frame upon which the same is mounted, a driving wheel, pulleys, one of which rotates with the driving wheel, an endless belt about said pulleys, the hopper having slots in the end walls through which said belt travels, a spout to said hopper, the walls of the spout being slotted for the reception of the belt which passes therethrough, said belt having two series of openings, one series upon either side of the longitudinal median line, one series adapted to receive the seed as the belt passes through the hopper and the other series discharging the seed from the spout, as set forth.

2. A seeder comprising a hopper, a frame upon which the same is mounted, a driving wheel, pulleys, one of which rotates with the driving wheel, an endless belt about said pulleys, the hopper having slots in the end walls through which said belt travels, an inclined spout fastened to the bottom of the hopper and registering with an opening in the bottom of the latter, said spout having slots in the opposite walls thereof through which the belt passes, said belt having perforations at one side of the longitudinal center thereof and openings upon the opposite side of said center, said perforations being adapted, as the belt passes through the seed hopper, to register with the exit opening in the bottom thereof, and said openings being covered as they pass through the hopper, the openings in the belt adapted to register with the spout and the perforations in the belt being offset from the opening in the spout, as set forth.

3. A seeder comprising a hopper, a frame upon which the same is mounted, a driving wheel, pulleys, one of which rotates with the driving wheel, an endless belt about said pulleys, the hopper having slots in the end walls through which said belt travels, a spout to said hopper, the walls of the spout being slotted for the reception of the belt which passes therethrough, said belt having two series of openings, one series upon either side of the longitudinal median line, one series adapted to receive the seed as the belt passes through the hopper and the other series discharging the seed from the spout, and a brush fastened to the hopper and adapted to contact with the upper surface of the belt, as set forth.

4. A seeder comprising a hopper, a frame upon which the same is mounted, a driving wheel, pulleys, one of which rotates with the driving wheel, an endless belt about said pulleys, the hopper having slots in the end walls through which said belt travels, an inclined spout fastened to the bottom of the hopper and registering with an opening in the bottom of the latter, said spout having slots in the opposite walls thereof and a laterally extending offset in the wall of the spout, said belt being provided with a series of perforations along one side of its longitudinal center and elongated openings upon the opposite side of the longitudinal center, means for covering said elongated openings as the belt passes through the hopper, and the walls of said offset serving to cover the perforations as the belt passes through the slots of the spout, as set forth.

5. A seeder comprising a hopper, a frame upon which the same is mounted, a driving wheel, pulleys, one of which rotates with the driving wheel, an endless belt about said pulleys, the hopper having slots in the end walls through which said belt travels, an inclined spout fastened to the bottom of the hopper and registering with an opening in the bottom of the latter, said spout having slots in the opposite walls thereof and a laterally extending offset in the wall of the spout, said belt being provided with a series of perforations along one side of its longitudinal center and elongated openings upon the opposite side of the longitudinal center, means for covering said elongated openings as the belt passes through the hopper, the walls of said offset serving to cover the perforations as the belt passes through the slots of the spout, and a brush fastened to the wall of the hopper and adapted to bear against the upper surface of the belt over the exit opening in the bottom of the hopper, as set forth.

In testimony whereof I hereunto affix my signature in presence of two witnesses.

JAMES C. SMITH.

Witnesses:
 A. L. HOUGH,
 A. R. FOWLER.

---

Copies of this patent may be obtained for five cents each, by addressing the "Commissioner of Patents, Washington, D. C."